United States Patent Office 2,773,891
Patented Dec. 11, 1956

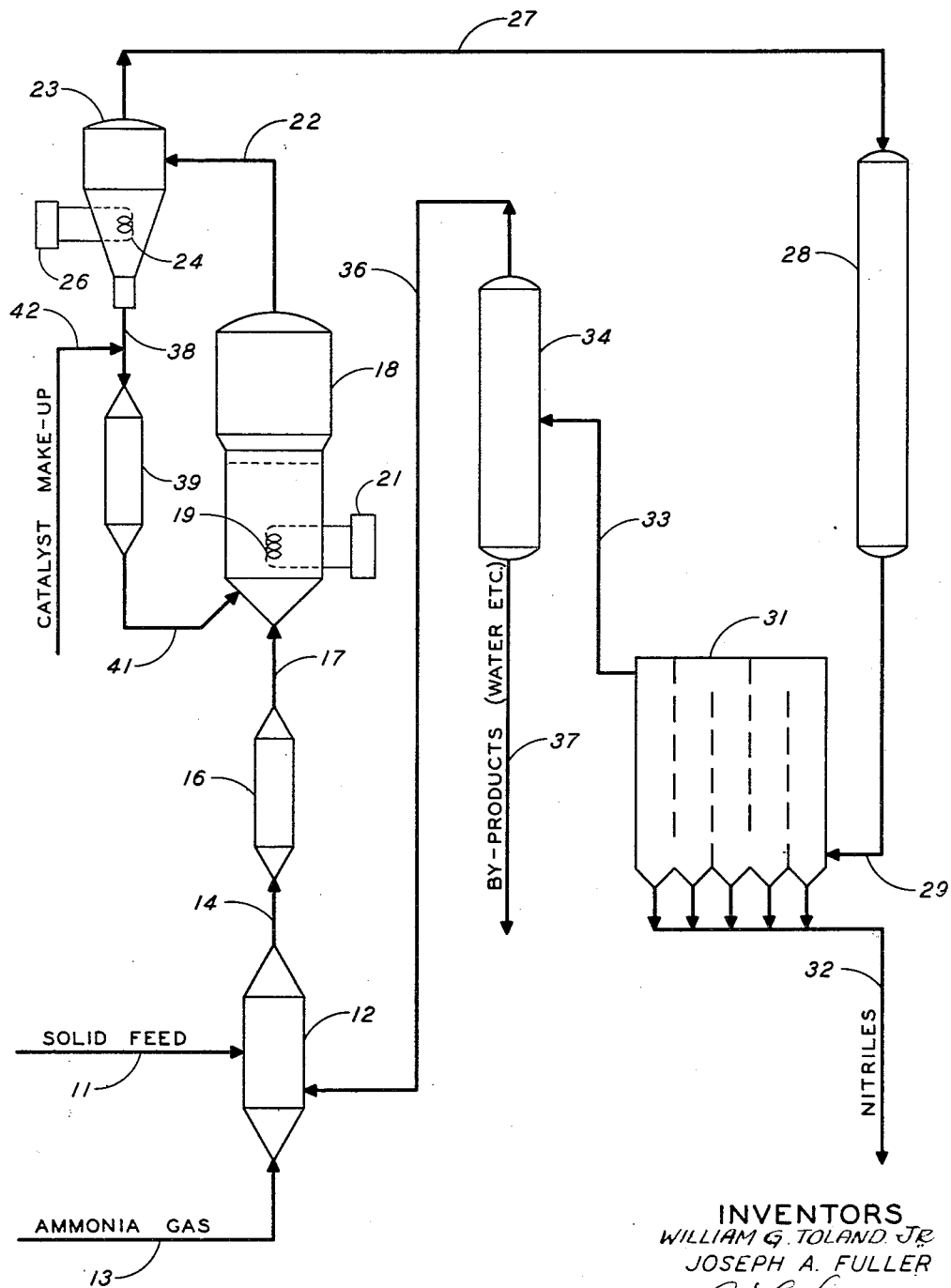

2,773,891

PREPARATION OF ISOPHTHALONITRILES AND TEREPHTHALONITRILES

William G. Toland, Jr., San Rafael, and Joseph A. Fuller, Richmond, Calif., assignors to California Research Corporation, San Francisco, Calif., a corporation of Delaware Application June 1, 1953, Serial No. 358,848

5 Claims. (Cl. 260—465)

This invention relates to an improved process for the preparation of isophthalonitriles and terephthalonitriles. More particularly, the invention relates to a catalytic process for the preparation of isophthalonitriles and terephthalonitriles in high yields from isophthalic acids and terephthalic acids.

Phthalodinitriles are valuable as pesticides, plasticizers and alkyd resin modifiers, and also as intermediates in organic synthesis such as the manufacture of amines, acids, amides, and complex nitrogenous dyestuffs. Phthalonitriles such as those prepared from isophthalic acid and terephthalic acid having their nitrile groups in non-adjacent positions on the benzene nucleus or separated by at least 3 carbon atoms of the benzene nucleus are particularly valuable. In addition to the aforementioned applications, these particular phthalonitriles are unusually adaptable to the production of superior fiber-forming linear polymers.

Orthophthalonitrile has been prepared by vaporizing materials such as phthalic anhydride, phthalimide and the like, and passing the vapors with ammonia over a suitable dehydrating catalyst at elevated temperatures. Such methods have not been satisfactory in the production of isophthalonitriles and terephthalonitriles from isophthalic acids and terephthalic acids. The unique characteristic of the isophthalic acids and terephthalic acids which makes their derivatives so useful in the production of superior fiber-forming linear polymers is largely due to their resistance to cyclization and the formation of low molecular weight products. This same characteristic causes the compounds to be more unstable at conventional nitrile formation temperatures than either phthalic anhydride or phthalimide, which have a stabilized ring substituent, and results in much lower yields, rendering the process uneconomical in commercial application. Expressed in another way, decarboxylation of the non-anhydride-forming isophthalic acids and terephthalic acids becomes a strongly competitive reaction at nitrile formation temperatures.

It is therefore an object of this invention to provide a catalytic process for the preparation of isophthalonitriles from isophthalic acids in high yields.

A further object of the invention is the provision of a process for the preparation of terephthalonitriles from terephthalic acids in high yields.

Still other objects of the invention will be apparent from the disclosure which follows hereinafter.

In attainment of the foregoing objects, we have discovered a process for producing isophthalonitrile and terephthalonitrile which comprises vaporizing solid isophthalic acid, terephthalic acid and their ammonium salts, monoamides and diamides in the presence of ammonia and a dehydrating catalyst.

The isophthalonitriles and terephthalonitriles prepared according to the process of this invention from isophthalic acids and terephthalic acids are obtained in excellent yields. These yields exceed even those reported for the production of orthophthalonitriles from phthalic anhydride or phthalimide which are not so susceptible to decomposition, for example, by decarboxylation, as isophthalic acids or terephthalic acids.

As mentioned, suitable starting materials include isophthalic acid, terephthalic acid and their ammonium salts, monoamides and diamides. These materials have as a common characteristic an inability to form a stabilized ring substituent, such as the anhydride or the imide of orthophthalic acid, and tend to decarboxylate under the conditions at which the process is carried out. The isophthalic acid and terephthalic acid, as well as the salts and amides thereof, may also be substituted by alkyl groups, as in the case of 1,3,5-tertiary butyl isophthalic acid.

Ammonium salts are among the preferred starting materials. Such salts have an advantage over the acids in that they are inert to ammonia atmosphere under which they may be fed and thus avoid caking in the initial stages of the process. The aforementioned tendency of the acids to cake when fed in ammonia atmosphere may be otherwise avoided by pressurizing the feeding lines with an inert gas, such as nitrogen, so that the acid is not exposed to ammonia before entering the reactor. The acids may also be heated in the feeding lines to prevent ammonium salt formation and caking.

Acid amides of isophthalic acid and terephthalic acid and their ammonium salts made by oxidation of metaxylene and paraxylene according to the process of U. S. Patent No. 2,610,980 to Naylor are also particularly satisfactory as starting materials.

In accordance with the invention, the isophthalic acid, terephthalic acid and their ammonium salts, monoamides and diamides are fed to the process in solid form. For convenient handling, the feed is desirably pulverized prior to its introduction. However, this is substantially a mechanical question and any size solid particles may be used conceivably.

It is essential to the present process that the vaporization of the acids, ammonium salts and amides be carried out in the presence of ammonia. The ratio of ammonia to the acids, salts and amides may vary. Although the reaction will proceed so long as some ammonia is present, it is desirable that at least one equivalent of ammonia per acid, salt or amide group be present. For highest yields 3 or more equivalents of ammonia are preferred. For present purposes from about 5 to about 15 equivalents of ammonia are found to be most satisfactory. Excess ammonia from the process may be recovered and recycled.

In the process it is also important that the lapse of time between vaporization of the acids, ammonium salts and amides and the contacting of the resultant vapor mixture with the dehydrating catalyst be kept at a minimum. It is therefore desirable to pass the solid feed directly into the catalytic reaction zone.

The dehydrating catalysts are known to the art and have been described in texts, for example, "Catalysis" by Berkman, Morrell and Egloff. For present purposes, catalysts such as alumina, silica and thoria, which are stable at the temperatures of operation, are particularly satisfactory. Other catalysts which are also very satisfactory include oxides of zirconium, beryllium, tungsten and vanadium and basic aluminum phosphate and basic aluminum sulfate. The catalysts may be in either fluid or fixed beds. Supports, such as alundum and the like, may be employed in the case of fixed beds. In fluid beds the catalyst is finely divided and ranges in size from 1 to 100 microns diameter, preferably with an average of about 40 microns. The flow rate of solid feed and ammonia or other gas in such a system is maintained at 0.5 to 6 feet per second and preferably at 1.5 to 2.0 feet per second.

The reaction time has a direct effect on the yields. In terms of space velocity calculated as grams of feed/cc. of catalyst/hour, it should not ordinarily exceed 10, and preferably should be below about 5, if highest yields are to be obtained. For economic reasons space velocities below 0.5 are not particularly desirable.

The temperature at which the vapor mixture of acids, ammonium salts and amides with ammonia is reacted in the presence of the dehydrating catalyst may be any temperature sufficient to maintain the mixture in a vapor state. Ordinarily, temperatures of 600 to 900° F. are considered most suitable. Temperatures of 700 to 800° F., and particularly those about 750° F., are preferred for present purposes.

Any suitable heating means known to the art may be employed for supplying the heat to the reaction according to the invention. Such means may involve internal or external heating of the reactor, preheating the reactants, or any desired combination thereof.

The reaction may be satisfactorily carried out at superatmospheric, subatmospheric or atmospheric pressures. For present purposes atmospheric pressures are preferred since they are convenient to operate under and do not require expensive vacuum or pressure equipment.

The following examples are offered in illustration of the invention. Unless otherwise stated, the proportions given are on a weight basis.

*Example 1*

A stream of ammonia amounting to 4.5 g. per minute was conducted through a cylindrical bed of 100 cc. of activated alumina maintained at 750° F. The upstream end of the catalyst bed was covered with 7 cc. of 3/16" stainless steel balls which served to accelerate heat transfer with the entering feed stream. Powdered, solid ammonium isophthalate was transported from a hopper and introduced into the ammonia stream at the entrance to the catalyst chamber by means of a screw conveyor. The feed rate of the salt was adjusted to 3.3 g. per minute. The product issued from the catalyst chamber in vaporized form and was condensed from the stream by cooling. From a total of 33 g. of salt was obtained 20.2 g. (96 mol percent) of colorless, crude isophthalonitrile having an acid number of zero, a saponification equivalent of 66.2 (theoretical saponification equivalent of isophthalonitrile is 64) and a melting point of 150–151.4° C. (pure isophthalonitrile has a melting point of 161° C.).

*Example 2*

The procedure of Example 1 was followed in utilizing ammonium terephthalate as feed. The ammonia rate was 5.0 g. per minute and the salt feed rate was 2.5 g. per minute. A total of 12.5 g. (97 mol percent) of terephthalonitrile was obtained from 20.2 g. of the salt. The crude product had an acid number of zero, a saponification equivalent of 64.2 (theoretical of 64) and a melting point of 220–225° C. (Pure terephthalonitrile has a melting point of 222° C.)

In a further example illustrating a preferred embodiment of the production of isophthalonitriles and terephthalonitriles according to this invention, a fluid bed system is employed.

Referring to the schematic flow diagram of the accompanying drawing, solid ammonium salts of a mixture of 85% isophthalic acid and 15% terephthalic acid are fed in particulate form via line 11 into mixer 12 at a rate of 1310 grams per hour. In mixer 12 the solid ammonium iso- and terephthalate particles are entrained in ammonia gas introduced via line 13 at a rate of 3500 grams per hour. The mixture of solid ammonium salts and ammonia gas is then conducted through line 14 into preheater 16 where it is heated to about 500 to 600° F.

From the preheater 16, the heated mixture of solid salts and ammonia gas is withdrawn through line 17 and introduced into reactor 18. Reactor 18 is a catalytic conversion zone having a relatively large cross-sectional area with reference to the cross-sectional areas of the feed inlet and the products outlet, and contains a fluid bed of approximately 600 cc. activated alumina ranging in particle size from 1 to 100 microns with an average of about 40 microns. The linear velocity of the solid ammonium salts and ammonia gas in the fluid bed ranges from about 1.5 to about 2.0 feet per second. The reactor temperature is maintained at about 700 to 900° F. by means of internal heating coils 19 supplied by heater 21.

The reaction products and excess ammonia from reactor 18 are withdrawn via line 22 and passed into cyclone separator 23 which is maintained at about 700 to 900° F. by means of heating coils 24 and heater 26. In separator 23, any entrained catalyst is separated and the reaction products, etc., are then conveyed via line 27 through vapor cooler 28 where they are cooled to about 700° F.

From cooler 28 the reaction products, etc., are carried via line 29 into condenser boxes 31 which are maintained at temperatures of about 300–500° F., that is, below the dew point of the phthalonitriles and above the dew point of benzonitrile, water and other by-products. From condenser boxes 31 isophthalonitrile and terephthalonitrile at a rate of 875 grams per hour is withdrawn through line 32. This amounts to a yield of approximately 100 mol percent. The product has an acid number of zero and a saponification equivalent of 65.5 compared to a theoretical of 64.

By-products of the reaction, such as water, benzonitrile and the like are withdrawn along with excess ammonia gas from condenser boxes 31 through line 33 and introduced into separator 34. In separator 34 ammonia gas is separated and returned via line 36 to the reaction. The by-products of the reaction are separated and withdrawn via line 37. They may be discarded or subjected to further treatment to recover valuable materials such as the benzonitriles.

Returning now to the fluid bed catalyst recovery system, the separated catalyst is withdrawn from separator 23 via line 38. It is then conveyed to heater 39 where it is heated to about 800 to 900° F. and returned via line 41 to reactor 18. Makeup catalyst is added as required through line 42.

Examination of the ultraviolet spectrum of mixed isophthalonitrile and terephthalonitrile products revealed that they had the same isomer ratio as the feeds. This indicates that the terephthalonitrile is formed as easily as the isophthalonitrile in the process according to the present invention.

We claim:

1. A process for producing a phthalonitrile, which comprises forming an ammonia gas stream having entrained therein at least one solid material selected from the group consisting of isophthalic acid, terephthalic acid and their ammonium salts, monoamides and diamides, the ammonia being present in an amount of at least three equivalents per equivalent of said solid material, passing said ammonia gas stream at a space velocity below about 10 and above about 0.5 calculated as grams of feed/cc. of catalyst per hour through a catalytic conversion zone containing a bed of finely divided fluidizable solid particles of a dehydration catalyst to maintain the bed in fluid, turbulent condition, maintaining a temperature within about the range of 700° F.–900° F. in said conversion zone to convert the entrained material in the ammonia gas stream into volatile products, including the phthalonitrile, withdrawing said volatile products along with ammonia gas from the conversion zone, and recovering the phthalonitrile.

2. A process for producing a phthalonitrile which comprises forming an ammonia gas stream having entrained therein at least one solid material selected from the group consisting of isophthalic acid, terephthalic acid and their ammonium salts, monoamides and diamides, the ammonia being present in an amount of at least three equivalents per equivalent of said solid material, preheating the ammonia gas stream to a temperature within about the range of 500° F. to 600° F., passing said preheated ammonia gas stream at a space velocity below about 10 and above about 0.5 calculated as grams of feed/cc. of catalyst per hour through a conversion zone having a relatively large cross-sectional area with respect to the cross-sectional areas of the inlet and outlet portions of said conversion zone, said conversion zone containing small, fluidizable particles of a dehydration catalyst, maintaining the dehydration catalyst particles in fluid, turbulent condition by the ammonia gas stream, and at a temperature within about the range of 700° F.–900° F. to convert the solid material entrained in the ammonia gas into volatile products, including the phthalonitrile, and withdrawing the volatile products along with ammonia gas from the conversion zone, and recovering the phthalonitrile.

3. Process according to claim 2 wherein the particle size of the dehydration catalyst ranges from about 1 to 100 microns, and the gaseous ammonia stream is passed through the conversion zone at a rate of about 0.5 to about 6 feet per second.

4. Process according to claim 3 wherein the dehydration catalyst is activated alumina.

5. Process according to claim 4 wherein the solid material entrained in the ammonia gas stream is a solid material selected from the group consisting of ammonium isophthalate and ammonium terephthalate and mixtures thereof.

References Cited in the file of this patent

UNITED STATES PATENTS

| | | |
|---|---|---|
| 2,054,088 | Linstead et al. | Sept. 15, 1936 |
| 2,591,493 | Arnold et al. | Apr. 1, 1952 |
| 2,678,941 | Ferstandig | May 18, 1954 |